US012680658B2

(12) United States Patent
He

(10) Patent No.: US 12,680,658 B2
(45) Date of Patent: Jul. 14, 2026

(54) LED EAVE LAMP AND METHOD THEREOF

(71) Applicant: Shangyou Jiayi Lighting Product Co., LTD., Ganzhou (CN)

(72) Inventor: Yaowen He, Ganzhou (CN)

(73) Assignee: Shangyou Jiayi Lighting Product Co., LTD, Ganzhou (CN)

( * ) Notice: Subject to any disclaimer, the term of this patent is extended or adjusted under 35 U.S.C. 154(b) by 0 days.

(21) Appl. No.: 19/003,207

(22) Filed: Dec. 27, 2024

(65) Prior Publication Data

US 2026/0117945 A1 Apr. 30, 2026

(30) Foreign Application Priority Data

Jun. 21, 2024 (CN) ......................... 202410809196.2

(51) Int. Cl.

*F21S 4/10* (2016.01)
*F21V 21/002* (2006.01)
*F21V 23/00* (2015.01)
*F21Y 115/10* (2016.01)

(52) U.S. Cl.

CPC .............. *F21S 4/10* (2016.01); *F21V 21/002* (2013.01); *F21V 23/001* (2013.01); *F21Y 2115/10* (2016.08)

(58) Field of Classification Search

CPC ......... F21S 4/10; F21V 21/002; F21V 23/001
See application file for complete search history.

(56) References Cited

U.S. PATENT DOCUMENTS

2014/0268818 A1* 9/2014 Huang ...................... F21V 5/04 362/335
2020/0025342 A1* 1/2020 Kleijnen ................ H10H 20/83
2020/0025360 A1* 1/2020 He ........................ F21V 23/002
2021/0270429 A1* 9/2021 Shao ................... F21V 19/0015
2022/0082217 A1* 3/2022 Shao .................... H10H 20/857
2023/0220960 A1* 7/2023 Liu ........................... F21S 4/10 362/217.14

* cited by examiner

*Primary Examiner* — Alexander K Garlen

(57) ABSTRACT

Provided are an LED eave lamp and a method thereof. The method includes the steps of: for a long conductor having at least two power supply wires insulated from each other, taking the long conductor as a lamp strip, and peeling off an insulating layer of the conductor in advance to expose the power supply wires therein to form a soldering position; and soldering one side, free of being provided with any circuit components, of a printed circuit board (PCB) in a lamp body of the LED eave lamp at the soldering position. A back surface of the LED eave lamp is not provided with any circuit components, all necessary circuit components are encapsulated inside LED lamp beads, space utilization is better, and failure such as a short circuit at the soldering position is not easily caused.

1 Claim, 6 Drawing Sheets

LED EAVE LAMP AND METHOD THEREOF

CROSS-REFERENCE TO RELATED APPLICATION

This application claims priority from the Chinese patent application 2024108091962 filed Jun. 21, 2024, the content of which is incorporated herein in the entirety by reference.

TECHNICAL FIELD

The present disclosure relates to LED lamps, in particular to an LED eave lamp and a method thereof.

BACKGROUND

An eave lamp is a lighting fixture that can be installed at an eave of a building. However, the eave is exposed to a rainwater environment, and therefore the eave lamp generally needs to be subjected to waterproofing treatment, for example, by means of dispensing with a large amount of adhesives, which increases materials and costs. In addition, an installation space at the eave is limited, which also puts forward requirements on heat dissipation of the eave lamp. These complex working conditions put forward requirements on the structural design and service life of the eave lamp. In addition, in the conventional manufacturing method for the eave lamp, there is a problem that a short circuit easily occurs due to a limited operating space when soldering wires.

In view of this, it is necessary to develop a new LED eave lamp to solve the above technical problems.

SUMMARY

In view of this, the present disclosure provides an LED eave lamp, including:

a first conductor, a second conductor, and a lamp body, wherein, the first conductor includes a first power supply line and a second power supply line which are insulated from each other, and the second conductor includes a third power supply line and a fourth power supply line which are insulated from each other, the first power supply line and the third power supply line being the same long wire that has not been disconnected, and the second power supply line and the fourth power supply line being the same long wire that has not been disconnected;

the first conductor is penetrated from one side of the lamp body;

the second conductor extends out from the other side of the lamp body; and the lamp body includes a printed circuit board (PCB) and LED lamp beads, and one side, facing away from the LED lamp beads, of the PCB is free of being provided with any circuit components.

Preferably, the first conductor further includes a first signal line, the second conductor further includes a second signal line, and the first signal line and the second signal line are two signal lines formed by disconnecting the same long wire.

Preferably, the lamp body further includes a bottom plate for fixing the LED eave lamp, a plane where the bottom plate is located is perpendicular to the one side or the other side, and the bottom plate and the PCB are respectively located on both sides of a plane where the first conductor and/or the second conductor are located.

Preferably, the bottom plate and the LED lamp beads are also respectively located on both sides of the plane where the first conductor and/or the second conductor are located.

Preferably, the PCB is soldered to soldering positions of a first conductor and a second conductor, the soldering positions being formed by peeling off insulating layers of the first conductor and the second conductor in advance.

Preferably, one side, facing the soldering positions, of the PCB is provided with at least one protrusion.

Preferably, one side, facing the LED lamp beads, of the PCB is provided with a lens.

Preferably, an outer diameter of the PCB is smaller than an outer diameter of the bottom plate.

Preferably, positioning holes are formed at an outer edge of the PCB to position the PCB and the lens.

In addition, the present disclosure also discloses a manufacturing method for an LED eave lamp, including the steps of:

for a long conductor having at least two power supply lines insulated from each other, taking the long conductor as a lamp strip, and peeling off an insulating layer of the conductor in advance to expose the power supply lines therein to form a soldering position; and soldering one side, free of being provided with any circuit components, of a printed circuit board (PCB) in a lamp body of the LED eave lamp at the soldering position.

In summary, the present disclosure has the following features:

A back surface of the LED eave lamp disclosed in the present disclosure is not provided with any circuit components, all necessary circuit components are encapsulated inside the LED lamp beads, space utilization is better, failure such as a short circuit at the soldering position is not easily caused, and mounting of the PCB and the bottom plate and heat dissipation are facilitated, and a better structural design of the LED eave lamp is achieved. In addition, the manufacturing method for the LED eave lamp disclosed in the present disclosure significantly reduces the problem that a short circuit easily occurs during soldering, and does not require cutting or cutting of a long conductor as a whole to increase process steps. In addition, the manufacturing method for the LED eave lamp disclosed in the present disclosure also solves the problem of inconvenience of directly connecting wires with the lamp body due to the increasing thickness of the wires. In addition, since one side, facing away from the lamp beads, of the PCB is not provided with any circuit components, after soldering the PCB, the amount of an adhesive that needs to be dispensed at the soldering position is also significantly reduced for waterproofing purposes. It should be further noted that the protrusion of the PCB is not only convenient for soldering operation at the soldering position, but also the thickness of the protrusion can be adjusted as needed, for example, when the thickness of the protrusion is adjusted so that the thickness of the protrusion is equal to or approximately equal to the thickness of the peeled insulating layer of the conductor, one side, facing away from the lamp beads, of the soldered PCB is just fitted to the plane where the first conductor and the second conductor are located, so as to avoid pseudo soldering caused by the situation that the PCB is jacked up by a part of the unpeeled insulating layer covered under the PCB when the PCB is soldered.

BRIEF DESCRIPTION OF DRAWINGS

In order to illustrate the technical solutions of the embodiments of the present disclosure more clearly, the drawings required for use in the embodiments will be briefly described below, and it should be understood that the following drawings illustrate only certain embodiments of the present disclosure and are therefore not to be construed as limiting the scope, and that other related drawings can be derived from these drawings for those of ordinary skill in the art without inventive step.

Figure 1:
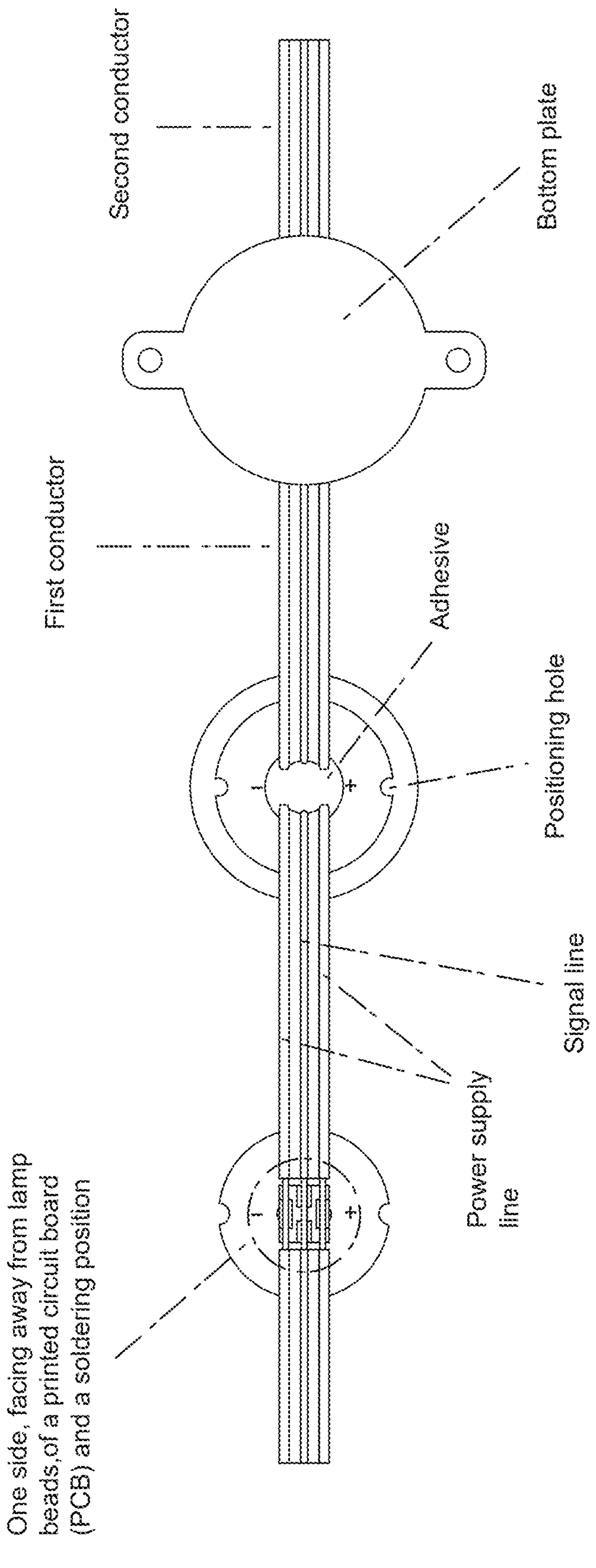
FIG. 1 is a schematic diagram of an LED eave lamp and a plurality of eave lamps forming a lamp strip according to an embodiment of the present disclosure, and illustrates eave lamps in different states during production.

It should be noted that the above drawings do not limit the dimensional proportions between wires, lamp beads, various ICs, and other parts, and the drawings are more illustrative of structures, connection relationships, spatial positional relationships, and the like.

DETAILED DESCRIPTION OF THE INVENTION

In order to make the objects, technical solutions and advantages of the embodiments of the present disclosure more clear, the technical solutions in the embodiments of the present disclosure will be clearly and completely described below in conjunction with FIGS. 3 to 6 in the embodiments of the present disclosure, and obviously, the described embodiments are a part of the embodiments of the present disclosure, rather than all of the embodiments. The components in the embodiments of the present disclosure as generally described and illustrated in the figures herein can be arranged and designed in a variety of different configurations.

Thus, the following detailed description of the embodiments of the present disclosure provided in the drawings is not intended to limit the scope of the claimed disclosure, but merely represents selected embodiments of the present disclosure. Based on the embodiments in the present disclosure, all other embodiments obtained by those of ordinary skill in the art without making inventive step belong to the scope of protection of the present disclosure.

It should be noted that like reference numerals and letters represent like items in the following figures, and therefore, once an item is defined in one figure, it need not be further defined and explained in subsequent figures.

In the description of the present disclosure, it should be noted that if the orientation or positional relationship indicated by the terms "upper", "lower", "inner", "outer", etc. is based on the orientation or positional relationship shown in the drawings, or the orientation or positional relationship conventionally placed during use of the product of the present disclosure, merely for ease of description of the present disclosure and for simplicity of description, but is not intended to indicate or imply that the referred device or element must have a particular orientation, and be constructed and operate in a particular orientation, and therefore is not to be construed as limiting the present disclosure.

Furthermore, the terms "first," "second," etc., where present, are used only to distinguish description and are not to be construed as indicating or implying relative importance.

It should be noted that the features in the embodiments of the present disclosure may be combined with each other without conflict.

In one embodiment, the present disclosure provides an LED eave lamp, including:

a first conductor, a second conductor, and a lamp body, wherein, the first conductor includes a first power supply line and a second power supply line which are insulated from each other, and the second conductor includes a third power supply line and a fourth power supply line which are insulated from each other, the first power supply line and the third power supply line being the same long wire that has not been disconnected, and the second power supply line and the fourth power supply line being the same long wire that has not been disconnected;

the first conductor is penetrated from one side of the lamp body;

the second conductor extends out from the other side of the lamp body; and the lamp body includes a printed circuit board (PCB) and LED lamp beads, and one side, facing away from the LED lamp beads, of the PCB is free of being provided with any circuit components.

In another embodiment, the first conductor further includes a first signal line, the second conductor further includes a second signal line, and the first signal line and the second signal line are two signal lines formed by disconnecting the same long wire.

In another embodiment, the lamp body further includes a bottom plate for fixing the LED eave lamp, a plane where the bottom plate is located is perpendicular to the one side or the other side, and the bottom plate and the PCB are respectively located on both sides of a plane where the first conductor and/or the second conductor are located.

In another embodiment, the bottom plate and the LED lamp beads are also respectively located on both sides of the plane where the first conductor and/or the second conductor are located.

In another embodiment, the PCB is soldered to soldering positions of a first conductor and a second conductor, the soldering positions being formed by peeling off insulating layers of the first conductor and the second conductor in advance.

In another embodiment, one side, facing the soldering positions, of the PCB is provided with at least one protrusion.

In another embodiment, one side, facing the LED lamp beads, of the PCB is provided with a lens.

In another embodiment, an outer diameter of the PCB is smaller than an outer diameter of the bottom plate.

In another embodiment, positioning holes are formed at an outer edge of the PCB to position the PCB and the lens.

In another embodiment, the present disclosure further discloses a manufacturing method for an LED eave lamp, including the steps of:

for a long conductor having at least two power supply lines insulated from each other, taking the long conductor as a lamp strip, and peeling off an insulating layer of the conductor in advance to expose the power supply lines therein to form a soldering position; and soldering one side, free of being provided with any circuit components, of a printed circuit board (PCB) in a lamp body of the LED eave lamp at the soldering position.

In another embodiment, for the manufacturing method, the lens may be arranged in a suitable process in the manner of upper and lower covers.

In another embodiment,

In the manufacturing method, a protective structure may be formed by injection molding directly after mounting the lens.

Figure 2:
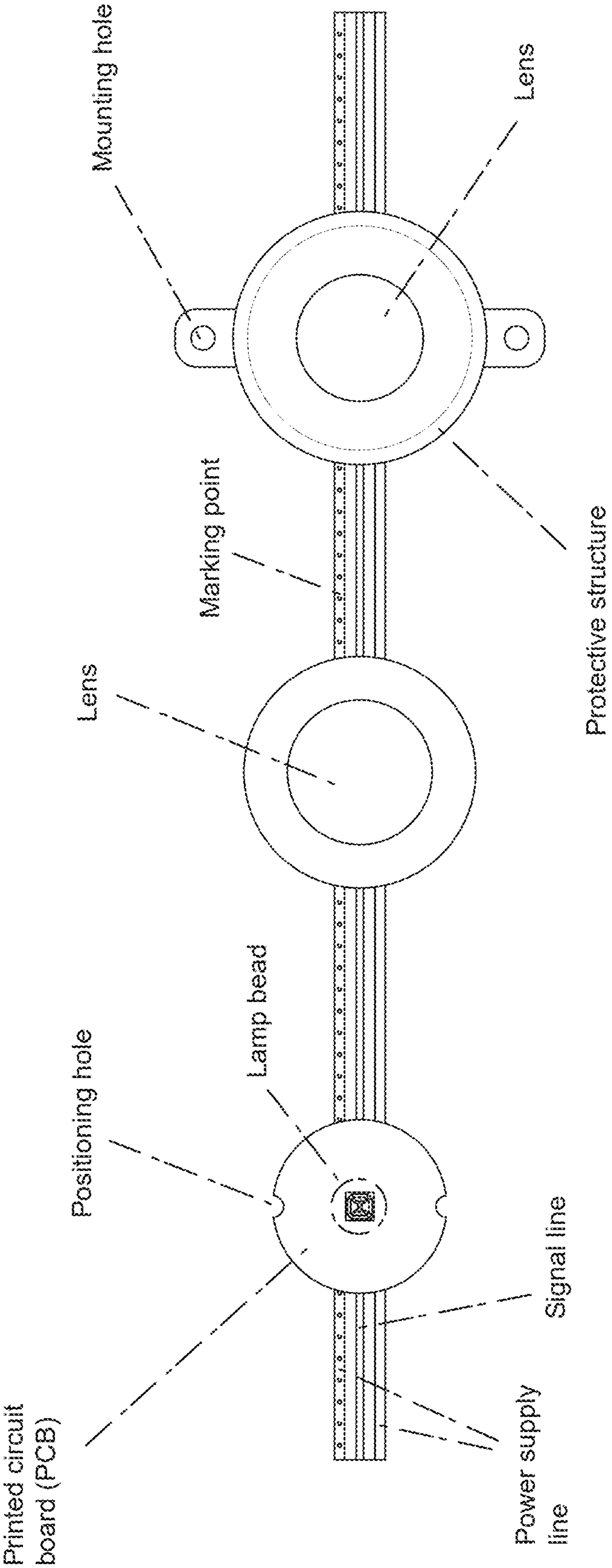
FIG. 2 is a schematic diagram of a reverse side of FIG. 1.
Figure 3:
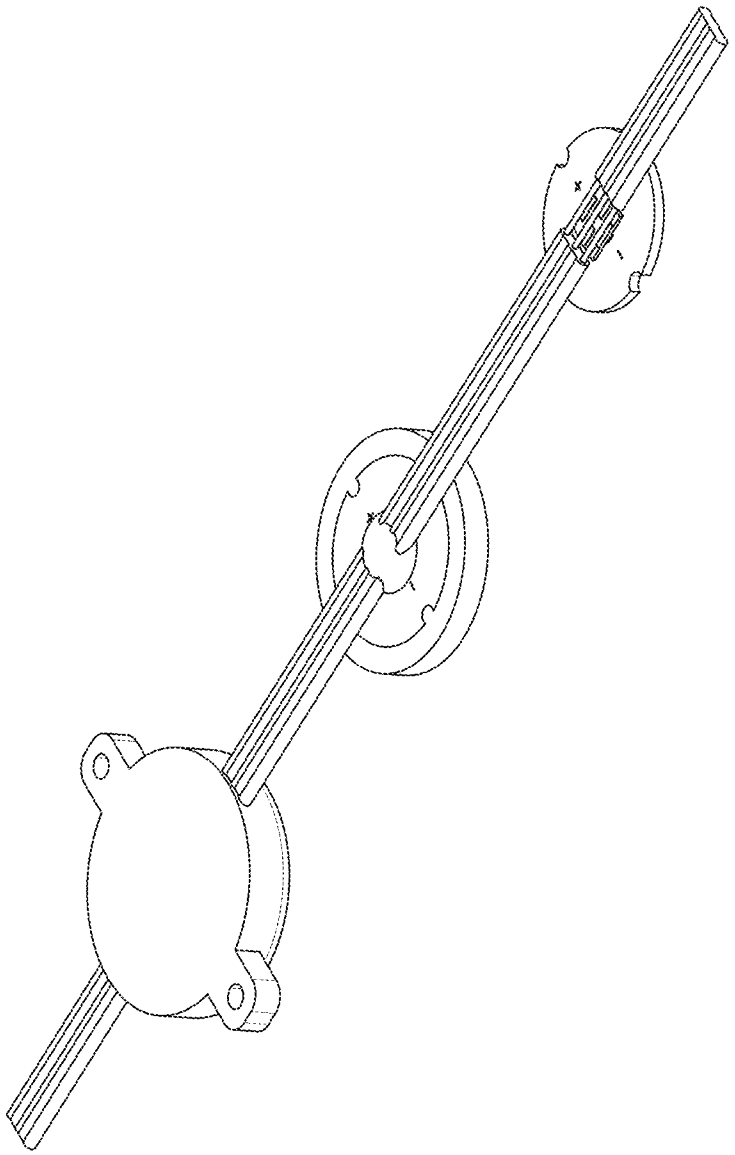
FIGS. 3 to 6 are schematic diagrams of LED eave lamps of different viewing angles and a plurality of eave lamps forming a lamp strip according to another embodiment of the present disclosure, and illustrate eave lamps in different states during production.
Figure 4:
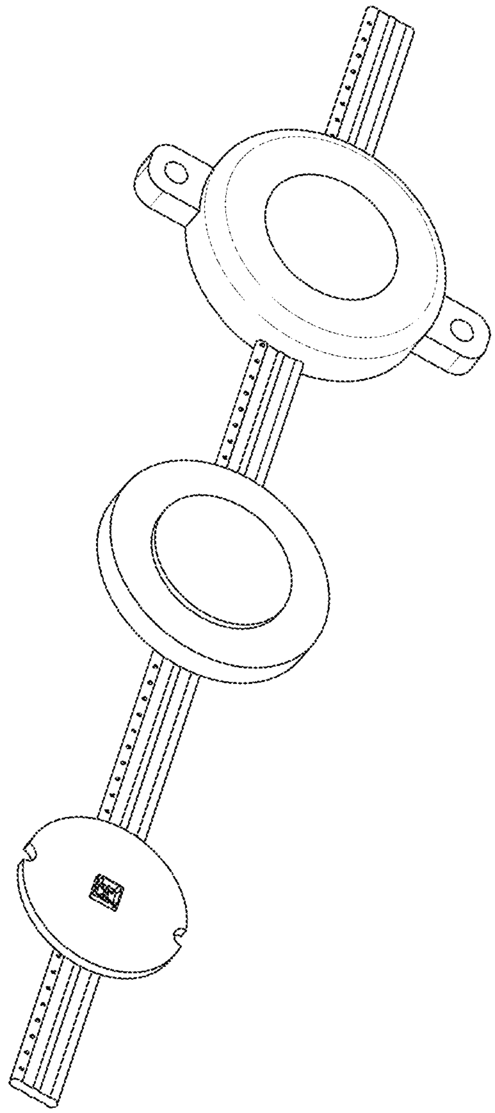
Figure 5:
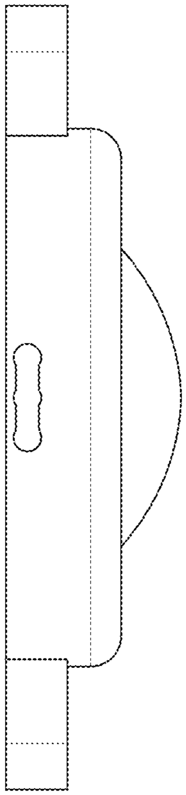
Figure 6:
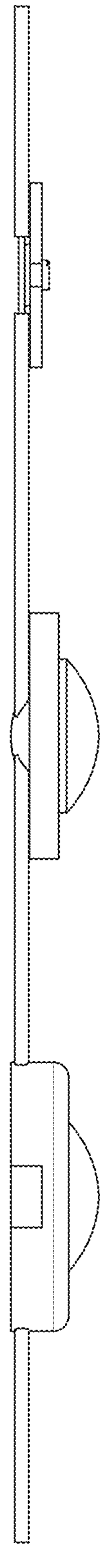

Reference is made to FIGS. 1 to 2 illustrating the LED eave lamp at different stages of production on a long conductor, wherein FIG. 1 indicates one side, facing away from the lamp beads, of the PCB and the soldering position, wherein as previously described, one side, facing away from the LED lamp beads, of the PCB is free of being provided with any circuit components;

FIG. 1 also indicates that one side, facing away from the lamp beads, of the PCB and the soldering position are also covered with an adhesive after dispensing treatment.

In connection with FIGS. 1 and 2, it can be seen that, two lugs further extend out from a body of the bottom plate in a straight line direction of passing through a centroid thereof, and a mounting hole is formed at the center of each lug. Thereby, the LED eave lamp is fixed and mounted.

Further, a first straight line where a connecting line of the two mounting holes is located and a second straight line where a connecting line of the two positioning holes are located in the same plane perpendicular to the PCB and the bottom plate, and the two mounting holes are more located outside a plane where the PCB is located compared with the two positioning holes.

In this way, not only the alignment of the PCB board with the lens is facilitated, but also the fixing and mounting of the LED eave lamp is facilitated without significant stress affecting the PCB and the lens.

For example, the body of the bottom plate may have a circular shape, or may have a symmetrical shape such as a rounded rectangular shape or a runway shape.

In another embodiment, in connection with FIGS. 1 to 6, it can be seen that, the lamp strip includes a plurality of the lamp bodies thereon, each lamp body and the first conductor and the second conductor on both sides thereof constitute one LED unit on the lamp strip.

In another embodiment,

When the first conductor and the second conductor have only two wires insulated from each other, one of the wires is used as a live wire or used for DC positive power supply, the other wire is used as a neutral wire or used for DC negative power supply, and the two wires insulated from each other are further configured to transmit signals to control the operating state of the lamp beads.

With further reference to FIGS. 1 and 2, in another embodiment, one side, facing the soldering position, of the PCB is provided with at least one protrusion, in particular 2 protrusions.

Wherein the 2 projections are respectively used for soldering of two opposite sides.

As previously noted, the protrusions of the PCB are not only convenient for soldering operation at the soldering position, but also the thickness of the protrusion can be adjusted as needed, for example, when the thickness of the protrusion is adjusted so that the thickness of the protrusion is equal to or approximately equal to the thickness of the peeled insulating layer of the conductor, one side, facing away from the lamp beads, of the soldered PCB is just fitted to the plane where the first conductor and the second conductor are located, so as to avoid pseudo soldering caused by the situation that the PCB is jacked up by a part of the unpeeled insulating layer covered under the PCB when the PCB is soldered.

Thus, it can also be seen that in the LED eave lamp disclosed in the present disclosure, a maximum outer diameter of the PCB is larger than a maximum outer diameter of a region where the insulating layer is peeled off at the soldering position, so that a part of the unpeeled insulating layer is still covered under the PCB to protect the soldering position.

In another embodiment, referring to FIGS. 1 to 6, the first conductor includes three wires insulated from each other and located in the same plane;

the second conductor includes three wires insulated from each other and located in the same plane;

wherein for the first conductor and the second conductor, two wires are used for the power supply lines and a third wire is used for the signal line. When the third wire is used for the signal line, the signal line can be disconnected or not disconnected:

when not disconnected, the signal line acts as a bus and transmits signals to DIN in each LED unit on the lamp strip to control the operation of the lamp beads, without affecting the signal line transmitting signals to the lamp beads in the other LED units regardless of which lamp bead is operating properly; and at this time, all LED units are in parallel relationship; and when disconnected, the signal line transmits signals to DIN in a first LED unit on the lamp strip to control the operation of its lamp beads, and outputs signals from DOUT in the first LED unit for transmission to other LED units in the subsequent stage. However, if there is a certain lamp bead or certain lamp beads in the middle that do not function properly, there is a high probability that the signal line will not successfully transmit signals to lamp beads in other LED units in the later stage.

Exemplarily, when there are 3 wires, a first wire is used as a live wire or as a power supply wire for direct current positive power supply, a second wire is used as a neutral wire or as a power supply wire for direct current negative power supply, and a third wire is used to transmit signals to control the operation state of the LED lamp beads. It should be noted that, as shown in FIG. 2, if it is necessary to distinguish wires connected to the positive electrode or the negative electrode, the outer surface of one of the wires may be marked as marking points to indicate that this wire is dedicated to being connected to the positive electrode or the negative electrode.

In another embodiment, the first conductor and the second conductor both have a strip-like structure, and the width of the strip-like structure of the first conductor and the second conductor is slightly smaller than an outer diameter of a coverage area of the adhesive on one side, facing away from the lamp beads, of the PCB board and an outer diameter of a coverage area of the adhesive at the soldering position.

Thus, this fully illustrates that the solution disclosed in the present disclosure significantly reduces the amount of the adhesive used, which is also due to the fact that one side, facing away from the lamp beads, of the PCB is free of being provided with any circuit components.

It should be noted that in the case of 110V-230V AC power supply, each light lamp itself includes dozens of LED chips in series or series-parallel connection to withstand the AC voltage of 110V or 230V. Even if the LED eave lamp of the present disclosure includes three lamp beads, any one of the lamp beads is cut off, and connected to an alternating current of 110V or 230V while keeping electrode wires on both sides of the lamp bead, and as long as the lamp bead itself does not have a failure, a circuit can be formed to cause the lamp bead to emit light. In contrast, the lamp beads connected in series obviously cannot do this because a plurality of lamp beads connected in series, as a whole, can be operated at a voltage of 110V or 230V, and if one of the lamp beads is directly cut to be connected to the voltage of 110V and 230V, the lamp bead will have a high probability of burning out. It can be understood that the present disclosure is not limited to voltages of 110V, 230V, etc., which can be other power supply voltage standards or may be in a wider voltage range.

Thus, in the case of parallel connection, each lamp bead can be freely cut off from the LED eave lamp, and after cutting, each lamp bead can meet the requirements of the power supply voltage when connected to a power supply. In addition, in the case of a failure of the lamp bead, the failed lamp bead can be freely cut off, and the original front and rear sections can be connected, the LED eave lamp continues to operate at the same power supply voltage under the condition that the length loss is not large, and the visual effect of illumination, i.e., the uniformity of brightness, can be maintained.

In one embodiment, the lamp bead is in the form of a patch. This is more conducive to improving manufacturing efficiency and ensuring product performance.

In one embodiment, the lamp bead is of a high pressure type. This is beneficial for the production of high-voltage parallel products.

The above description is only specific embodiments of the present disclosure, but the protection scope of the present disclosure is not limited thereto, and any variations or substitutions easily conceivable by those skilled in the art within the technical scope of the present disclosure should be covered by the protection scope of the present disclosure. Therefore, the protection scope of the present disclosure should be subject to the protection scope of the claims.

The invention claimed is:

1. An LED eave lamp, comprising:

a first conductor, a second conductor, and a lamp body, wherein, the first conductor comprises a first power supply line and a second power supply line which are insulated from each other, and the second conductor comprises a third power supply line and a fourth power supply line which are insulated from each other, the first power supply line and the third power supply line being the same long wire that has not been disconnected, and the second power supply line and the fourth power supply line being the same long wire that has not been disconnected;

the first conductor is penetrated from one side of the lamp body;

the second conductor extends out from the other side of the lamp body;

the lamp body comprises a circular printed circuit board (PCB) and LED eave lamp beads, and one side, facing away from the LED eave lamp beads, of the PCB is free of being provided with any circuit components; one side, facing away from the lamp beads, of the PCB and soldering position are covered with an adhesive after dispensing treatment;

the first conductor further comprises a first signal line;

the second conductor further comprises a second signal line;

the first signal line and the second signal line are two signal lines formed by disconnecting the same wire;

the lamp body further comprises a circular bottom plate for fixing the LED eave lamp; a plane where the bottom plate is located is perpendicular to the one side or the other side of the lamp body;

the bottom plate and the PCB are respectively located on both sides of a plane where the first conductor and the second conductor are located;

the bottom plate and the LED eave lamp beads are respectively located on both sides of the plane where the first conductor and the second conductor are located;

the PCB is soldered to soldering positions of a first conductor and a second conductor, the soldering positions being formed by peeling off insulating layers of the first conductor and the second conductor in advance;

one side, facing the soldering positions, of the PCB is provided with two protrusions; the protrusions of the PCB are for soldering operation at the soldering position; when the thickness of the protrusion is adjusted so that a thickness of the protrusion is equal to or approximately equal to a thickness of a peeled insulating layer of the first conductor; one side, facing away from the lamp beads, of the soldered PCB is just fitted to the plane where the first conductor and the second conductor are located, so as to avoid pseudo soldering caused by a situation that the PCB is jacked up by a part of the unpeeled insulating layer covered under the PCB when the PCB is soldered;

one side, facing the LED eave lamp beads, of the PCB is provided with a lens;

an outer diameter of the PCB is smaller than an outer diameter of the bottom plate; a maximum outer diameter of the PCB is larger than a maximum outer diameter of a region where the insulating layer is peeled off at the soldering position, so that a part of the unpeeled insulating layer is still covered under the PCB to protect the soldering position;

two positioning holes are formed at an outer edge of the PCB to position the PCB and the lens;

two lugs further extend out from a body of the bottom plate in a straight line direction of passing through a centroid thereof, and a mounting hole is formed at the center of each lug; and the LED eave lamp is fixed and mounted;

a first straight line where a connecting line of two mounting holes is located and a second straight line where a connecting line of the two positioning holes are located in the same plane perpendicular to the PCB and the bottom plate;

the two mounting holes are more located outside a plane where the PCB is located compared with the two positioning holes;

when the first conductor and the second conductor include two wires insulated from each other, one of the wires is used as a live wire or used for DC positive power supply, the other wire is used as a neutral wire or used for DC negative power supply, and the two wires insulated from each other are further configured to transmit signals to control an operating state of the lamp beads;

the first conductor further includes a third wire insulated from the first and the second wire and is located in the same plane as the first wire and the second wire;

the second conductor includes a third wire insulated from the first wire and the second wire, and is located in the same plane as the first wire and the second wire;

for the first conductor and the second conductor, two wires are used for the power supply lines and a third wire is used for the signal line; when the third wire is used for the signal line, the signal line is configured to be disconnected or not disconnected;

when not disconnected, the signal line acts as a bus and transmits signals to DIN in each LED unit on a lamp strip to control the operation of the lamp beads, without affecting the signal line transmitting signals to the lamp beads in the other LED units regardless of which lamp bead is operating properly; and at this time, all LED units are in parallel relationship; wherein the lamp strip includes a plurality of the lamp bodies thereon, and each lamp body and the first conductor and the second conductor on both sides thereof constitute one LED unit on the lamp strip; and when disconnected, the signal line transmits signals to DIN in a first LED unit on the lamp strip to control the operation of lamp beads of the first LED unit, and outputs signals from DOUT in the first LED unit for transmission to other LED units in a subsequent stage.

* * * * *